United States Patent [19]

Grant et al.

[11] Patent Number: 4,852,799
[45] Date of Patent: Aug. 1, 1989

[54] WEATHERIZED, BAFFLED, GAS FILTERED, SEMI-AUTOMATIC HEATING SYSTEM FOR A POULTRY HOUSE OR THE LIKE

[76] Inventors: Ace A. Grant; Vivian M. Grant, both of Circulo Del Sur, Green Valley, Ark. 85614

[21] Appl. No.: 254,616

[22] Filed: Oct. 7, 1988

[51] Int. Cl.⁴ ............................................. A01K 31/20
[52] U.S. Cl. ...................... 237/3; 432/222; 432/37; 431/42
[58] Field of Search .............. 165/3, 59; 432/37, 222; 236/49, 10, 11; 237/14, 3, 4, 46; 431/18, 350, 286, 279, 42, 45

[56] References Cited

U.S. PATENT DOCUMENTS

| | | |
|---|---|---|
| 3,297,259 | 1/1967 | Maxon, Jr. |
| 4,278,423 | 7/1981 | Siccardi ............................ 432/222 |
| 4,369,030 | 1/1883 | Siccardi ............................ 432/37 |
| 4,373,912 | 2/1983 | Mitchell ............................ 432/222 |
| 4,524,722 | 6/1985 | Saccardi ............................ 119/34 |
| 4,773,471 | 9/1988 | Grant et al. |

Primary Examiner—Henry A. Bennet
Attorney, Agent, or Firm—Victor Flores; Harry M. Weiss

[57] ABSTRACT

This invention discloses a heating and cooling system for buildings, such as poultry buildings, that provides clean, filtered gas fuel, efficiently burns gas fuel by providing adjustable airflow profile plates that blocks cold air from reaching the inside of the building and creates an air mixture control for the burning flame on the burner, that provides rain gutter means that prevent rain moisture from being drawn into the air stream of the unit and that has an actuating means coupled to the pilot light that assure safe operation by shutting off the gas fuel valves in the event of loss of flame in the pilot.

15 Claims, 3 Drawing Sheets

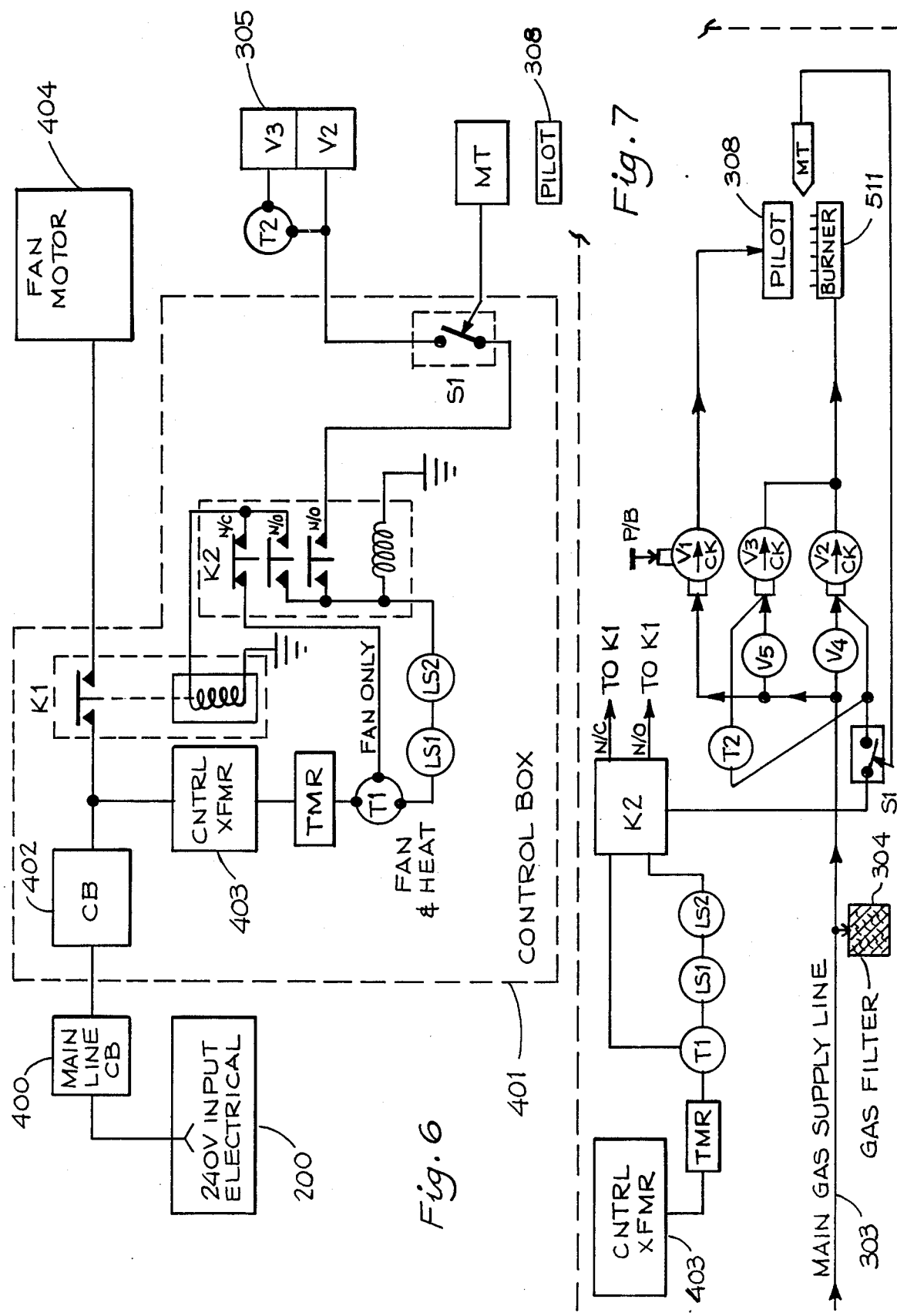

WEATHERIZED, BAFFLED, GAS FILTERED, SEMI-AUTOMATIC HEATING SYSTEM FOR A POULTRY HOUSE OR THE LIKE

RELATED U.S. PATENTS

The present application is directed to the subject matter described in U.S. patent application Ser. No. 169,279 entitled: "Integrated Water Misting Heating and Cooling System for Poultry Buildings or the Like" now U.S. Pat. No. 4,773,471.

FIELD OF THE INVENTION

The present invention relates to heating and cooling systems for buildings. More particularly, the present invention relates to heating and cooling systems for buildings, such as poultry buildings that provide the minimal levels of gas fuel quality and operation controls and designs. Yet more particularly, the present invention relates to baffling airflow, controlling rain from affecting humidity of the air flow, controlling quality of gas fuel and utilization of the fuel to optimize building temperature and humidity and providing a safe operation upon loss of flame in the system.

DESCRIPTION OF THE PRIOR ART

It is known to provide a building, such as poultry building with complex heating and cooling systems to control the environment. Typical of the prior art teachings are U.S. Pat. Nos. 4,278,423, 4,369,030 and 4,524,722. The prior art teaches thermostatically controlled heating and cooling units provided with high air velocity blowers which are activated according to temperature settings of the thermostats located out of the direct path of the air flow pattern in the building. U.S. Pat. No. 4,278,423 teaches a heating and cooling system for poultry houses wherein a heater and cooling unit is provided with a fan and burner which ignites according to an electric signal and responsive to thermostat settings. Also taught in U.S. Pat. No. 4,278,423 is the use of thermal limit switches set to turn the power off in the event of an elevated temperature condition, typically greater than 160 degrees Fahrenheit. U.S. Pat. No. 4,369,030 teaches an improvement to a similar heating and cooling system of U.S. Pat. No. 4,278,423 by adding a curtain controller and an automatic damper on the air inlet portion of the unit. U.S. Pat. No. 4,524,722 teaches a method wherein the livestock body heat is factored in the utilization of a heating and cooling system described in U.S. Pat. Nos. 4,278,423 and 4,369,030 by including circulating fans and variable duty factor operation of the system.

The prior art also teach an integrated humidity control apparatus with the heater and cooling units. The applicants issued U.S. Pat. No. 4,773,471 teaches controlling the humidity by providing a heating and cooling system with a water misting system that is integrated with airflow control means that results in synchronized pulsating operation of the heater and main blower with the booster circulating fans to better provide a continuous pulsating wave of conditioned air circulating throughout the building. This type of system is directed for use by large scale poultry farms and may not be suitable for the small poultry farm operator.

All heating systems known to the applicant have deficiencies with regard to not controlling the quality of the gas fuel used, allowing the introduction of moisture into the airstream from the outside during a rainy season, being severely inefficient in burning the gas fuel, and lacking in a fail safe means to assure that the gas valves feeding the burner are shut off in the event of loss of a pilot light.

Therefore, a need is seen to exists to provide a heating and cooling system for buildings, such as poultry buildings with design features that are directed to improving the quality of gas fuel, provide better air mixtures for burning the gas fuel, prevent rain moisture from being mixed with the air being generated by the unit and providing a safe shut off of gas valves in the event of loss of pilot light.

SUMMARY OF THE INVENTION

The present invention provides an improved heating and cooling system designed to satisfy the aforementioned needs. Therefore, as a primary objective, the invention is directed at providing a heating and cooling system for buildings, such as poultry buildings, that provides clean gas fuel, efficiently burns the fuel by controlling the air mixture, that will not be affected by rain moisture from outside air and that has an actuating means coupled to the pilot to assure safe operation by shutting off the gas fuel valves in the event of loss of flame in the pilot. These objects are satisfied by adapting the unit with an external hooded air inlet port weatherized with rain gutters to prevent receiving rain moisture into the airstream, adapted with an air baffling profile plate means for optimizing the air being used by the burner of the unit and preventing drafts of air from passing into the building, with an actuating means that will safely control the flow of gas to a set of gas valves feeding the burner element by virtue of being in thermal contact with the flame of the pilot and a gas filtering means that assures that the burner will receive clean gas fuel that is free of impurities, such as moisture droplets that form in gas line that cause sputtering and other undesirable problems with the burner.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 6 is a schematic block diagram showing the electrical connections for the timer and relays that selectively power the fan or the fan and burner valves of the forced-air heating and cooling unit.

FIG. 7 is a schematic block diagram showing a combined electrical and gas flow connections in the heating and cooling unit, including the mercury tube actuating tube that controls the application of electrical power to the gas valves, also shown is the gravitational sedimentation gas line filter at the entry point of the gas fuel line.

DESCRIPTION OF THE PREFERRED EMBODIMENT

Figure 1:
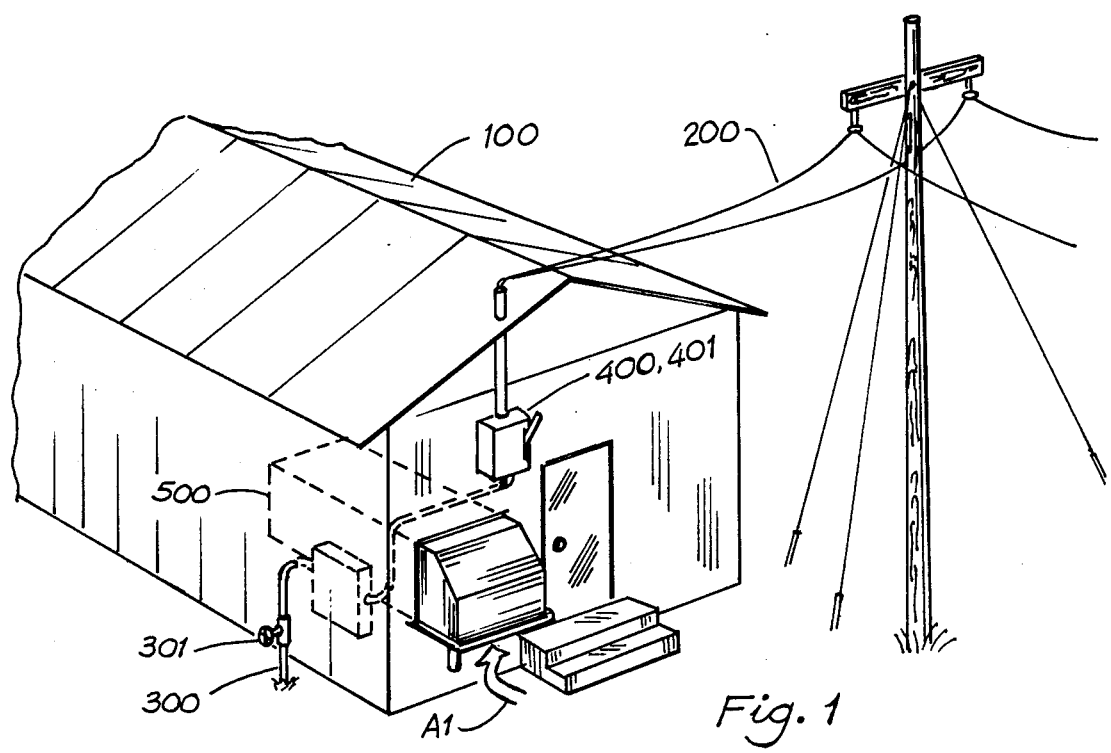
FIG. 1 is a fragmentary perspective view of a building, such as a poultry building, wherein is seen the placement of the heating and cooling unit of the present invention.

Referring now to FIG. 1 where there is shown a building 100 adapted for installing a heating and cooling unit 500 for housing livestock, such as poultry, and having available an electrical source 200, a gas source 300 provided with an external shut-off valve 301. Primary heating and cooling unit 500 is positioned at one end of the building 100 and being located offset from centerline of the building to allow generation of an airflow pattern from outside air designated by air flow arrow A1. Heating and cooling unit 500 is electrically controlled from electric control panel 400, 401, panel 401 being associated with unit 500, that are electrically coupled to electrical source 200.

Figure 2:
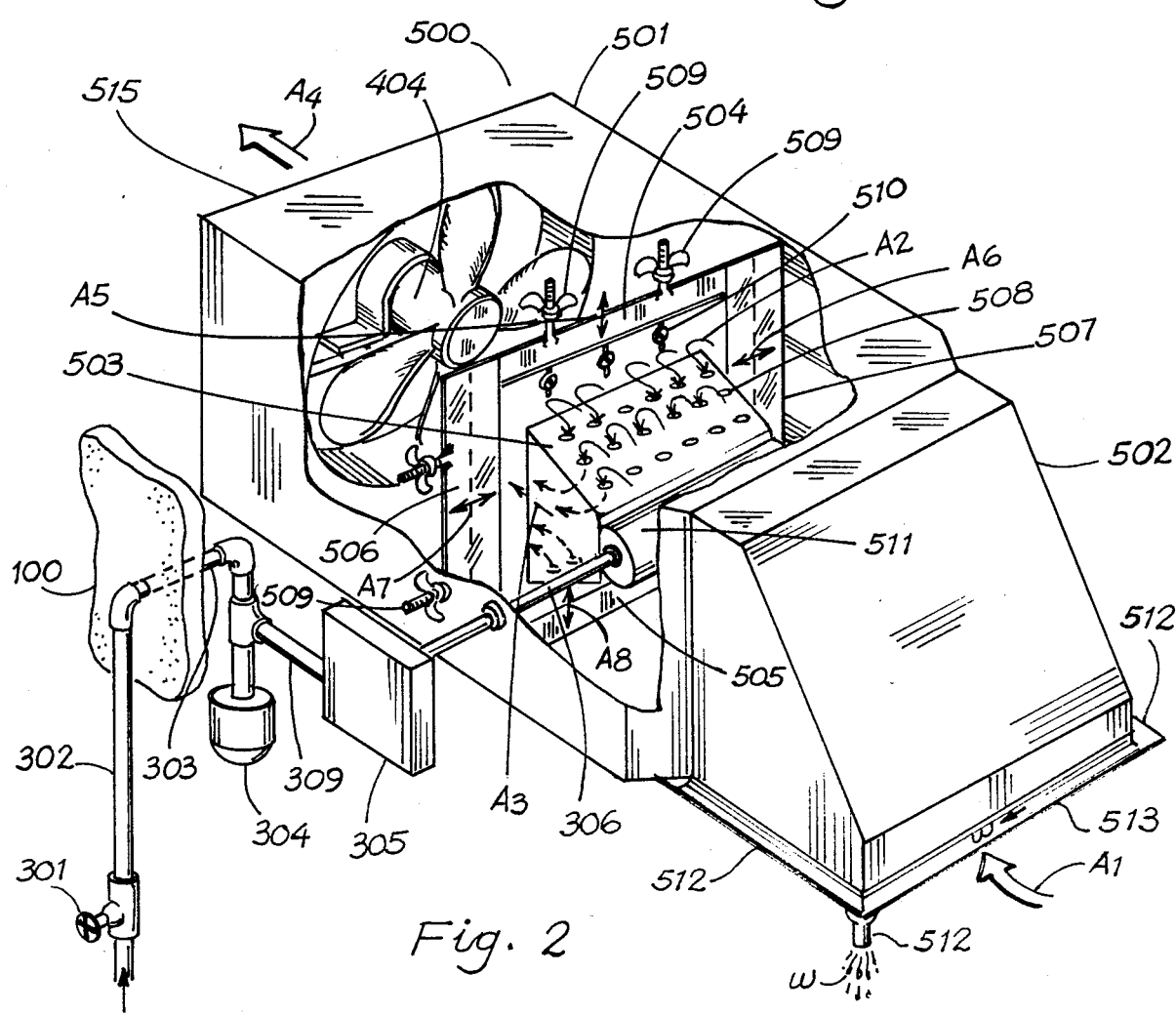
FIG. 2 is a partial cutaway view of a heating and cooling unit according to the present invention showing the extendable baffle plate means detachably installed to the exterior walls of the unit and a gravitational sedimentation gas line filter in-line with the gas line feeding the gas burner assembly.
Figure 3:
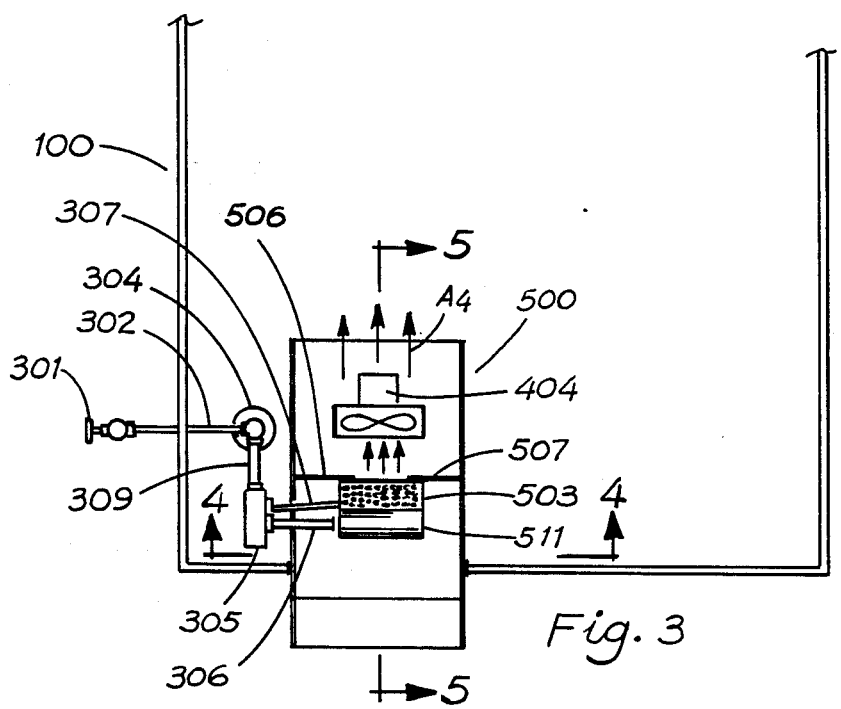
FIG. 3 is a plan view of a building adapted with the present invention showing the gas line feeding the gas line filter, a gas control panel, the burner assembly and the fan means within the forced-air heating and cooling unit.
Figure 4:
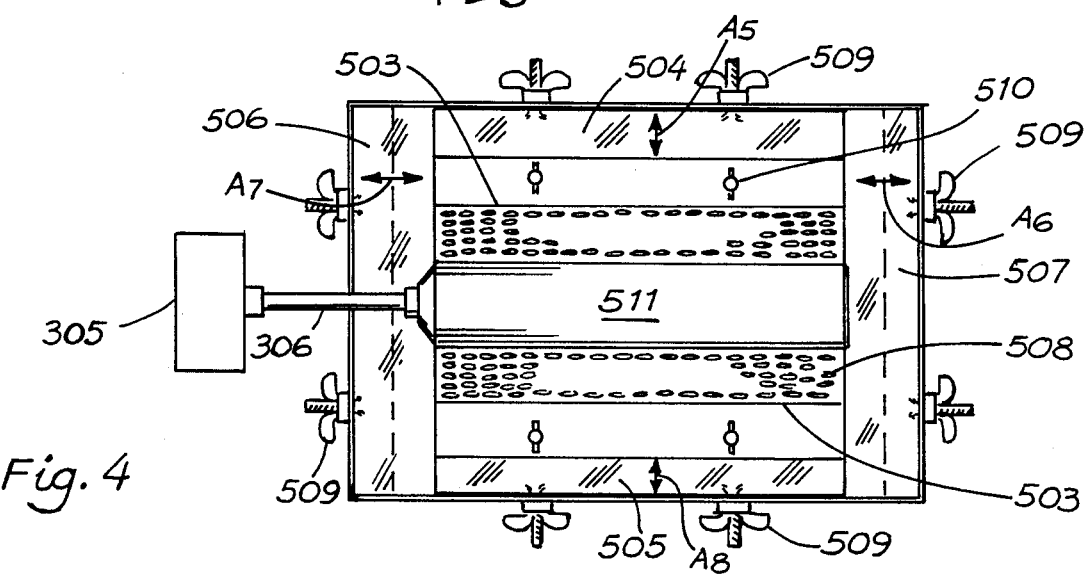
FIG. 4 is a sectional view taken along line 4—4 of FIG. 3 showing the extendable profile plate means attached to the outer walls of the unit and to the normally provided profile plates of a conventional burner assembly.
Figure 5:
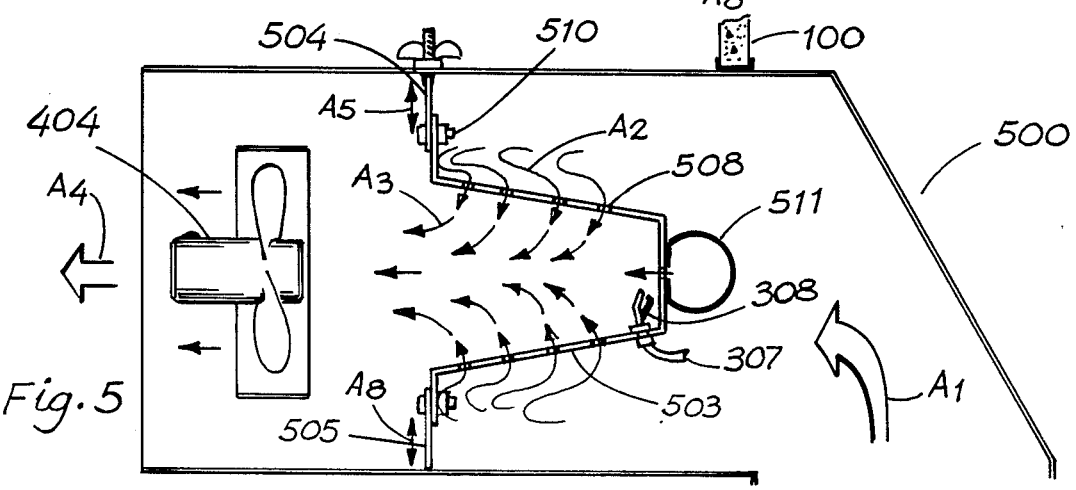
FIG. 5 is a sectional view taken along line 5—5 of FIG. 3 showing a side view of the fan means and the burner assembly provided with the extendable profile plate means and a pilot means in close proximity to a burner element.

Referring now to FIG. 2 showing a fragmentary view of the components of unit 500 including an enclosure 501, a hooded inlet port 502 provided with rain gutters 512, 513 for directing rain water W away from airflow entry designated A1, an outlet port 515 that directs forced air, designated A4 from fan means 404, a burner assembly 503 adapted with extendable profile plate means 504,505,506,507 and being adjustable as shown by arrows A5,A6,A7,A8 and attachable to the apertured plates 508 and the side walls of enclosure 501 using bolt means 509, 510. Apertured plates 508 on conventional burner assemblies are small and do not provide adequate baffling around the burner assembly 503 and contribute to inefficiencies in heating systems using them. Thus, profile plate means 504,505,506,507 allows the building manager to adjust the plates outward or inward using bolt means 509, 510, depending on the need, to baffle the air flow to burner element 511 and obtain a hotter flame to improve the heating efficiency, see also FIGS. 4 and 5. FIGS. 2, 3 and 5 also shows the baffling of the airflow, as indicated by arrows A2, being directed into the burner element 511 portion of burner assembly 503 and towards fan means 404, as indicated by arrow A3, and out the unit as shown by arrow A4.

FIG. 2 also shows the improvement being made by the present invention in delivering cleaner gas fuel to the burner element 511 by including a gas filter 304 in-line with gas lines 302, 303. The gas filter 304 is preferably a gravity aided sedimentation gas filter that will collect impurities in the gas fuel prior to entering gas line 309 and gas control box 305 containing gas pilot valve V1, primary and secondary valves V2 and V3 and manual adjustment valves V4 and V5. Since the system of the present invention is intended for a small operation, pilot valve means V1 is a manually operated pilot means 308 but could be upgraded to a type that produces a high voltage arc from an electronic means as is used in applicant's U.S. Pat. No. 4,773,471. From gas control box 305, gas fuel is distributed to pilot means 308 via pilot line 307 and to gas burner 511 via gas line 306.

Referring now to FIGS. 6 and 7, wherein electrical energy is supplied from source 200 and gas fuel is supplied from gas source 300 via gas lines 302 and 302. In operation, gas is available for use at valves V1-V5 for distribution to the pilot means 308 and burner 511, while electrical energy is available at circuit breaker 402 supplied from a main circuit breaker in control box 401. To begin operation, the circuit breaker 402 is turned on to power the control voltage transformer 403 to provide power to the timer TMR, then timer TMR is set to turn on and off according to seasonal requirements and electrical flow direction setting of thermostatic device T1, i.e. whether set to "FAN ONLY" or "FAN & HEAT". Assuming the setting is for FAN ONLY, then the power would flow directly to the coil of K1 to operate fan means 404 via the normally closed set of contacts of K2. If the requirements calls for FAN & HEAT, then pilot valve V1 is used to light pilot means 308 which will heat the actuating means, shown as MT for mercury tube means that will contain the mercury that will expand from the heat of the pilot light and cause switch means S1 to operate to the on position. Actuating means MT may be any thermal sensitive device that functions to close switch S1. Assuming that T1 is set to the FAN & HEAT position, then electrical energy will be distributed via limit switches LS1 and LS2 to the coil of K2, that will cause the normally closed contacts to open and the normally open contacts to close and power the fan means 404 from K1 and energize and open primary valve V2 to deliver gas fuel to burner 511. If the burner flame were to be blown out, the MT would cause S1 to open and turn off V2 to prevent the escape of raw gas fuel, while fan means 404 would still be operating. Timer TMR is preferably one that would allow varying intervals of on and off times to create a pulsating flow of air in building 100 and allow for control of humidity that is common when the building 100 is used as a poultry building. The heating system is provided with a second gas valve, V3, installed in parallel with V2 to provide boosting of gas fuel to reduce the swing in temperature within the building 100. Valve V3 is also thermostatically controlled by thermostat device T2 that is set to open V3 at a lower temperature setting than T1. Further, the system of the present invention provides manual gas flow control with valves V4 and V5 upstream of valves V2 and V3. With V4 and V5, the operator is given the manual control to enable adjustment of the gas flowing into the burner 511 and thus the amount of heat being distributed out of the outlet port 515.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

We claim:

1. A heating and cooling system for installation within a building, such as a poultry building, said poultry building having an electrical source and a pressurized gas fuel source available for utilization by said system, said system comprising:
- (a) a main forced-air heating and cooling means having an inlet port for receiving outside air, an outlet port adjacent a fan means for directing heated outside air and unheated outside air into a mainstream airflow pattern within said poultry building, a gas burner assembly for generating heat, said gas burner assembly being adapted with extendable baffle plate means for controlling the air profile feeding a flame used to generate said heat;
- (b) a control means for controlling operation of said fan means and the flow of gas flowing from said gas fuel source to said gas burner assembly, said control means comprising,
  - (i) a timer means,
  - (ii) a gas pilot means,
  - (iii) a plurality of gas burner valve means; and
- (c) a gas line filtering means for collecting impurities such as moisture condensation droplets contained in said gas fuel.

2. A heating and cooling system for installation within a building, such as a poultry building as recited in claim 1, wherein:
said inlet port being adapted with rain gutters means for preventing the introduction of moisture into said main forced-air heating and cooling means.

3. A heating and cooling system for installation within a building, such as a poultry building as recited in claim 1, wherein:
said extendable baffle plate means being extendable from said gas burner assembly towards enclosure walls of said main forced-air heating and cooling means to produce a controlled baffling capability and associated controlled heat generation.

4. A heating and cooling system for installation within a building, such as a poultry building as recited in claim 1, wherein:
said control means further includes an actuating means operatively coupled to said gas pilot means for enabling operation of said plurality of gas burner valve means.

5. A heating and cooling system for installation within a building, such as a poultry building as recited in claim 4, wherein:
said actuating means comprises an interconnecting tube closely coupled to said pilot means containing a heat expanding substance, such as mercury, that controls engaging and disengaging a switch means that electrically couples a voltage from said electrical source to a primary valve member of said plurality of gas burner valves that enables and disables a flow of gas fuel to a burner element of said gas burner assembly.

6. A heating and cooling system for installation within a building, such as a poultry building as recited in claim 5, wherein:
said plurality of gas valves comprises a parallel secondary valve member electrically dependent on said primary valve member being actuated before enabling a flow of gas.

7. A heating and cooling system for installation within a building, such as a poultry building as recited in claim 6, wherein:
said actuating means is closely coupled to said pilot means for purposes of receiving thermal energy that causes expansion of said heat expanding substance; and
said primary and said secondary valve members each having manually operated shut-off valves located upstream for providing manual control of gas flow to said gas burner element.

8. A heating and cooling system for installation within a building, such as a poultry building as recited in claim 1, wherein:
said gas line filtering means comprises a gravity-aided sedimentation gas line filter.

9. A heating and cooling system for installation within a building, such as a poultry building, said poultry building having an electrical source and a pressurized gas fuel source available for utilization by said system, said system comprising:
- (a) a main forced-air heating and cooling means having an inlet port for receiving outside air, an outlet port adjacent a fan means for directing heated outside air and unheated outside air into a mainstream airflow pattern within said poultry building, a gas burner assembly for generating heat, said inlet port being adapted with rain gutters means for preventing the introduction of moisture into said main forced-air heating and cooling means;
- (b) a control means for controlling operation of said fan means and the flow of gas flowing from said gas fuel source to said gas burner assembly.

10. A heating and cooling system for installation within a building, such as a poultry building, said poultry building having an electrical source and a pressurized gas fuel source available for utilization by said system, said system comprising:
- (a) a main forced-air heating and cooling means having an inlet port for receiving outside air, an outlet port adjacent a fan means for directing heated outside air and unheated outside air into a mainstream airflow pattern within said poultry building, a gas burner assembly for generating heat, said gas burner assembly being adapted with extendable baffle plate means for controlling the air profile feeding a flame used to generate said heat, said extendable baffle plate means being extendable from said gas burner assembly towards enclosure walls of said main forced-air heating and cooling means to produce a controlled baffling capability and associated controlled heat generation; and
- (b) a control means for controlling operation of said fan means and the flow of gas flowing from said gas fuel source to said gas burner assembly.

11. A heating and cooling system for installation within a building, such as a poultry building, said poultry building having an electrical source and a pressurized gas fuel source available for utilization by said system, said system comprising:
- (a) a main forced-air heating and cooling means having an inlet port for receiving outside air, an outlet port adjacent a fan means for directing heated outside air and unheated outside air into a mainstream airflow pattern within said poultry building, a gas burner assembly for generating heat, said inlet port being adapted with rain gutters means for preventing the introduction of moisture into said main forced-air heating and cooling means, said gas burner assembly being adapted with extendable baffle plate means for controlling the air profile feeding a flame used to generate said heat, said extendable baffle plate means being extendable from said gas burner assembly towards enclosure walls of said main forced-air heating and cooling means to produce a controlled baffling capability and associated controlled heat generation; and (b) a control means for controlling operation of said fan means and the flow of gas flowing from said gas fuel source to said gas burner assembly.

12. A heating and cooling system for installation within a building, such as a poultry building, said poultry building having an electrical source and a pressurized gas fuel source available for utilization by said system, said system comprising:

(a) a main forced-air heating and cooling means having an inlet port for receiving outside air, an outlet port adjacent a fan means for directing heated outside air and unheated outside air into a mainstream airflow pattern within said poultry building, a gas burner assembly for generating heat, said inlet port being adapted with rain gutters means for preventing the introduction of moisture into said main forced-air heating and cooling means, said gas burner assembly being adapted with extendable baffle plate means for controlling the air profile feeding a flame used to generate said heat, said extendable baffle plate means being extendable from said gas burner assembly towards enclosure walls of said main forced-air heating and cooling means to produce a controlled baffling capability and associated controlled heat generation;

(b) a control means for controlling operation of said fan means and the flow of gas flowing from said gas fuel source to said gas burner assembly; and (c) a gas line filtering means for collecting impurities such as moisture condensation droplets contained in said gas fuel, said gas line filtering means comprises a gravity-aided sedimentation gas line filter.

13. A heating and cooling system for installation within a building, such as a poultry building, said poultry building having an electrical source and a pressurized gas fuel source available for utilization by said system, said system comprising:

(a) a main forced-air heating and cooling means having an inlet port for receiving outside air, an outlet port adjacent a fan means for directing heated outside air and unheated outside air into a mainstream airflow pattern within said poultry building, a gas burner assembly for generating heat, said inlet port being adapted with rain gutters means for preventing the introduction of moisture into said main forced-air heating and cooling means, said gas burner assembly being adapted with extendable baffle plate means for controlling the air profile feeding a flame used to generate said heat, said extendable baffle plate means being extendable from said gas burner assembly towards enclosure walls of said main forced-air heating and cooling means to produce a controlled baffling capability and associated controlled heat generation;

(b) a control means for controlling operation of said fan means and the flow of gas flowing from said gas fuel source to said gas burner assembly, said control means comprising, (i) a control voltage transformer means electrically coupled to said electrical source, (ii) a timer means electrically coupled to said transformer means for sequentially energizing and de-energizing said heating and cooling system, (iii) a plurality of thermostatically controlled gas burner valve means coupled to said gas burner assembly, (iv) relay means for controlling distribution of electrical energy to said fan means and said plurality of gas burner valve means, (v) a gas pilot means, (vi) an actuating means operatively coupled to said gas pilot means for enabling operation of said plurality of gas burner valve means, said actuating means comprises an interconnecting tube closely coupled to said pilot means containing a heat expanding substance, such as mercury, that controls engaging and disengaging a switch means that electrically couples a voltage from said relay means to a primary valve member of said plurality of gas burner valves that enables and disables a flow of gas fuel to a burner element of said gas burner assembly; and (c) a gas line filtering means for collecting impurities such as moisture condensation droplets contained in said gas fuel, said gas line filtering means comprises a gravity-aided sedimentation gas line filter.

14. A heating and cooling system for installation within a building, such as a poultry building as recited in claim 13, wherein:

said plurality of gas valves comprises a secondary parallel valve member electrically dependent on said primary valve member being actuated before enabling a flow of gas.

15. A heating and cooling system for installation within a building, such as a poultry building as recited in claim 14, wherein:

said actuating means is closely coupled to said pilot means for purposes of receiving thermal energy that causes expansion of said heat expanding substance; and said primary and said secondary valve members each having manually operated shut-off valves located upstream for providing manual control of gas flow to said gas burner element.

* * * * *